United States Patent
Condon et al.

(10) Patent No.: US 7,637,553 B2
(45) Date of Patent: Dec. 29, 2009

(54) HEAD RESTRAINT FOR A CONVERTIBLE MOTOR VEHICLE

(75) Inventors: Alan Richard Condon, Essex (GB); Torsten Gerhardt, London (GB); John K Harding, Leigh-on-Sea (GB); Steve David Fleming, Hockley (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/961,362

(22) Filed: Dec. 20, 2007

(65) Prior Publication Data

US 2008/0150306 A1     Jun. 26, 2008

Related U.S. Application Data

(63) Continuation of application No. PCT/GB2006/002051, filed on Jun. 5, 2006.

(30) Foreign Application Priority Data

Jun. 29, 2005    (GB)    ................... 0513226.1

(51) Int. Cl.
    *B60N 2/00*    (2006.01)
(52) U.S. Cl. .................... 296/63; 297/391
(58) Field of Classification Search ............ 296/63, 296/68.1, 108; 297/408, 395, 391
    See application file for complete search history.

(56) References Cited

U.S. PATENT DOCUMENTS

| | | | | |
|---|---|---|---|---|
| 2,649,142 | A | * | 8/1953 | New .................... 297/395 |
| 3,703,313 | A | * | 11/1972 | Schiesterl et al. .......... 297/391 |
| 3,964,788 | A | * | 6/1976 | Kmetyko .................. 297/395 |
| 4,123,104 | A | * | 10/1978 | Andres et al. ............. 297/391 |
| 4,249,754 | A | * | 2/1981 | Best ..................... 297/395 |
| 4,725,076 | A | * | 2/1988 | Taylor ................... 297/395 |
| 4,729,592 | A | * | 3/1988 | Tuchiya et al. ............ 296/116 |
| 5,295,711 | A | * | 3/1994 | Huan .................... 297/395 |
| 5,647,630 | A |   | 7/1997 | Jambor et al. |
| 5,711,579 | A | * | 1/1998 | Albrecht ................. 297/391 |

(Continued)

FOREIGN PATENT DOCUMENTS

DE    4438190    11/1995

(Continued)

OTHER PUBLICATIONS

International Preliminary Report on Patentability for PCT/GB2006/002051 dated Jan. 9, 2008.

(Continued)

*Primary Examiner*—Kiran B. Patel
(74) *Attorney, Agent, or Firm*—Gregory Brown; Brooks Kushman P.C.

(57) ABSTRACT

A motor vehicle is disclosed having one or more seat assemblies each of which has an automatically stowable head restraint associated with it. Each head restraint is pivotally supported by a stowable rear roof panel and is biased into a stowed position in which it lies adjacent to the rear roof panel by a spring. A latch mechanism is used to hold the head restraint in a lowered position in which it depends downwardly from the roof panel for use by an occupant of the motor vehicle. The latch mechanism is automatically released by the process of stowing the rear roof panel or a front roof panel.

8 Claims, 2 Drawing Sheets

U.S. PATENT DOCUMENTS 5,967,591 A    10/1999   Muehlhausen et al.
6,073,986 A *   6/2000   Neale et al. .................... 296/63
6,199,900 B1 *   3/2001   Zeigler ....................... 280/735

FOREIGN PATENT DOCUMENTS

| | | | |
|---|---|---|---|
| DE | 19909883 | A1 | 9/1999 |
| DE | 10261901 | A1 | 8/2004 |
| GB | 2325620 | A | 12/1998 |
| GB | 2336303 | A | 10/1999 |

OTHER PUBLICATIONS

Search Report under Section 17(5) for GB0513226.1 dated Sep. 27, 2005.

German Office Action for corresponding Application No. 11 2006 001 302.5, mailed Apr. 6, 2009, 2 pages.

* cited by examiner

HEAD RESTRAINT FOR A CONVERTIBLE MOTOR VEHICLE

CROSS-REFERENCE TO RELATED APPLICATIONS

This is a continuation of International Application PCT PCT/GB2006/002051 with an International Filing date of Jun. 5, 2006, which claims priority to GB application 0513226.1 filed Jun. 29, 2005.

FIELD OF THE INVENTION

This invention relates to head restraints for motor vehicles and in particular to a head restraint for a convertible motor vehicle.

BACKGROUND OF THE INVENTION

It is known from, for example, GB-A 2,325,620 to provide a head restraint for a motor vehicle that is moveable between a raised or stowed position in which the head restraint lies adjacent to a roof panel of the motor vehicle and a lowered position in which the head restraint is positioned above the backrest of a seat for use by a passenger of the vehicle seated upon the seat. The head restraint is physically moved from its raised or lowered positions by an occupant of the motor vehicle by releasing a latch used to hold the head restraint in its two positions.

It is an object of this invention to provide a motor vehicle having stowable front and rear roofs with one or more head restraints that are automatically stowed before either of the roofs is moved fully into its stowed position.

According to the invention, there is provided a motor vehicle having front and rear stowable roof panels moveable between raised and lowered positions and at least one seat assembly having a backrest, an automatically stowable head restraint rotatably supported by the rear roof panel for movement between a stowed position in which the head restraint lies adjacent an inside surface of the rear roof panel and an in use position in which the head restraint is positioned above the backrest of the seat assembly, a biasing means to bias the head restraint into the stowed position and a latch mechanism to selectively hold the head restraint in the lowered position wherein the latch mechanism is released by the process of lowering one of the front and rear roof panels so as to permit the head restraint to move to its stowed position.

The motor vehicle may have front and rear rows of seats and the rear roof panel when in the lowered position may be stowed between the front and rear rows of seats.

The motor vehicle may have front and rear rows of seats and each of the seats in the rear row of seats having a head restraint may have an automatically stowable head restraint.

The latch mechanism may be released by a linkage connected to part of the mechanism used to raise and lower the front roof panel.

Alternatively, the latch mechanism may be released by a linkage connected to part of the mechanism used to raise and lower the rear roof panel.

As yet another alternative, the latch mechanism may be released by a linkage connected to part of a locking mechanism used to hold the front and rear roof panels together when they are both in their respective raised positions.

The linkage may be one of a cable linkage, a rod linkage, a chain linkage and a fluid connection.

As yet a further alternative, the latch mechanism may be an electro-mechanical latch mechanism and may be connected to an electronic controller used to control the raising and lowering of at least one of the front and rear roof panels and the electronic controller may be operable to release the latch mechanism so as to permit the head restraint to move to its stowed position when a signal is received indicative that at least one of the front and rear roof panels is in the process of being moved to its lowered position.

BRIEF DESCRIPTION OF THE DRAWINGS

The invention will now be described by way of example with reference to the accompanying drawings of which:—

DETAILED DESCRIPTION

Figure 1:
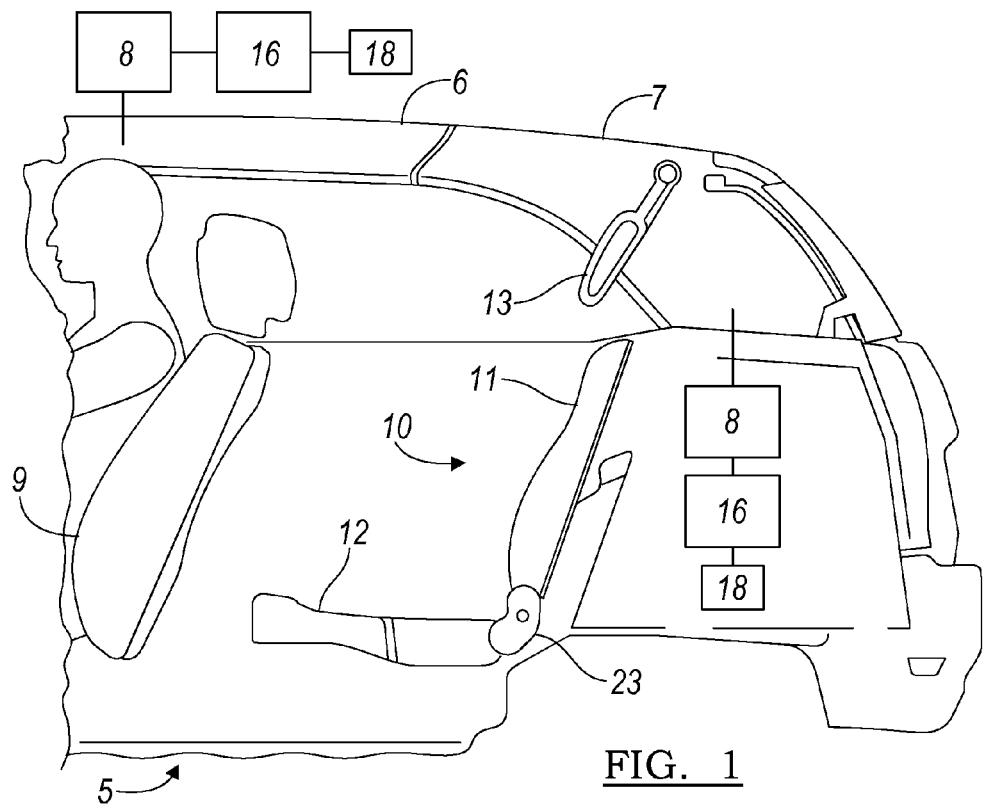
FIG. 1 is a cutaway side view of part of motor vehicle having a pair of head restraints in accordance with the invention showing moveable front and roof panels in raised positions.
Figure 2:
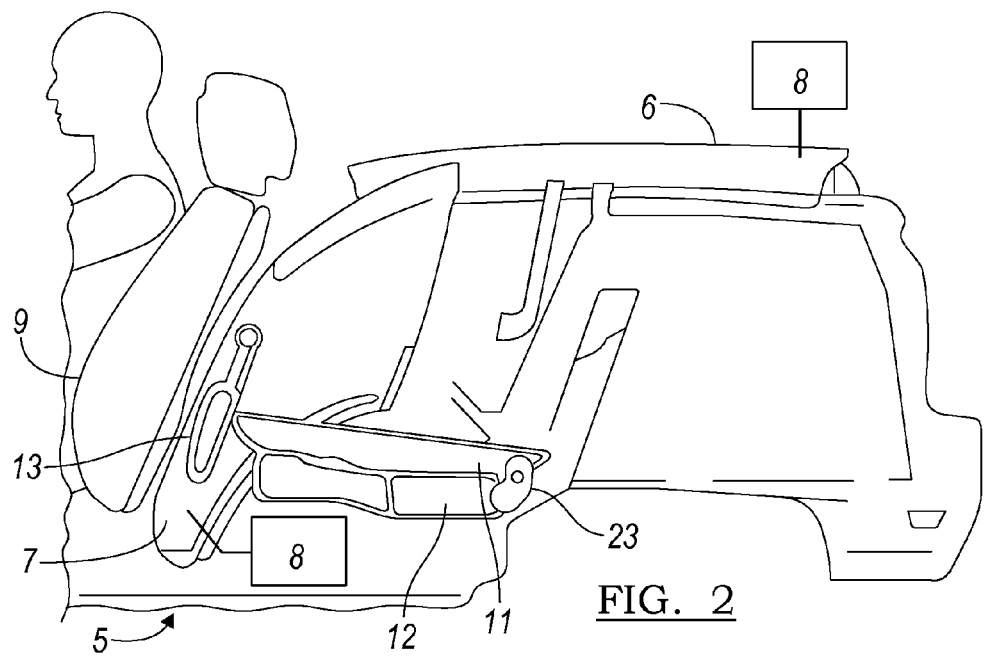
FIG. 2 is a cutaway side view of part of a motor vehicle according to the invention showing the moveable front and roof panels in stowed positions.
Figure 3:
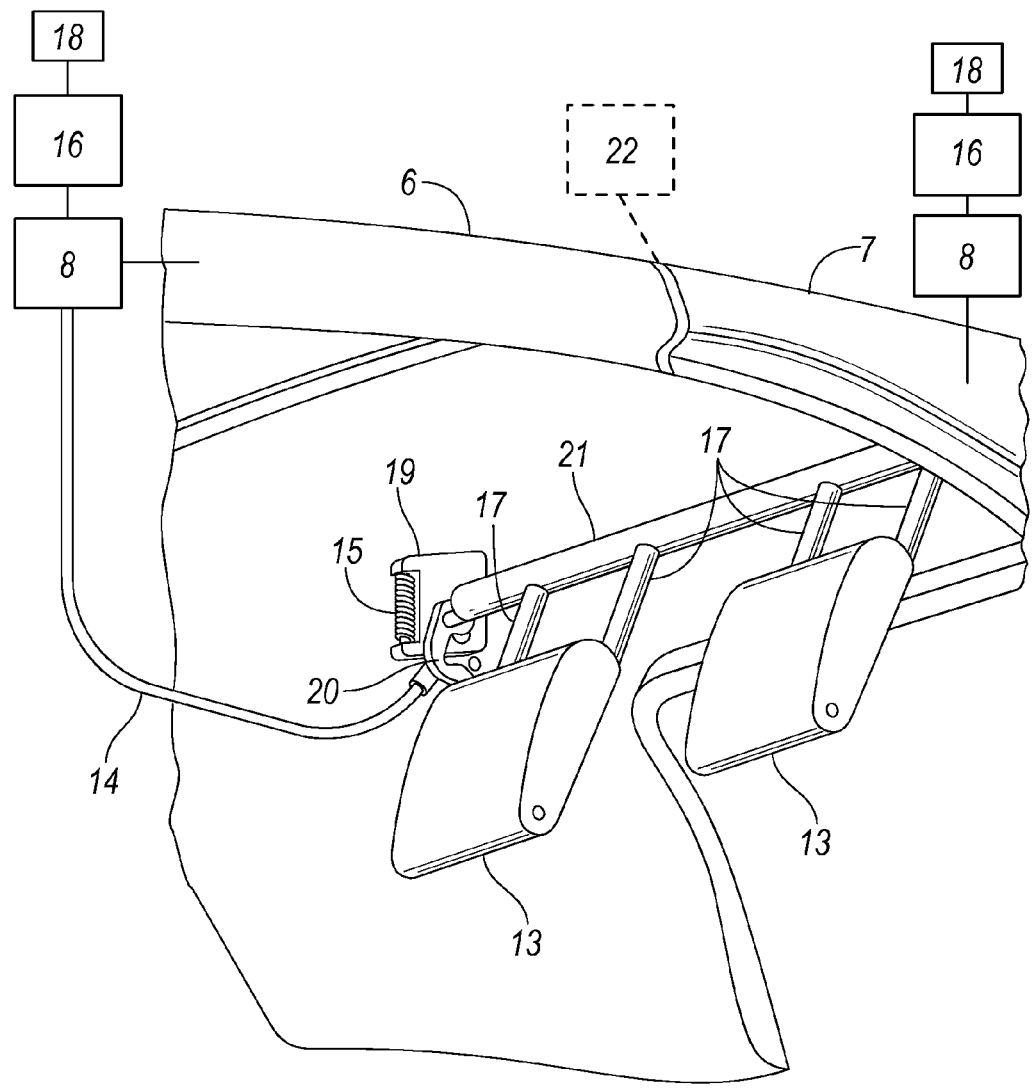
FIG. 3 is a pictorial view of the inside of the rear roof panel showing a head restraint assembly according to one embodiment of the invention.

With particular reference to FIGS. 1 to 3, there is shown a motor vehicle 5 having front and rear stowable roof panels 6 and 7 each of which is moveable between a raised position as shown in FIG. 1 and a lowered or stowed position as shown in FIG. 2.

The front roof panel 6 is moveable by means of an arm arrangement of linkage mechanism 8, having a number of connected arms of which one is driven by an electric motor 16 or some other power source to move the front roof panel 6 from its raised position to its stowed position and vice-versa.

A similar multi-arm linkage mechanism 8 or a chain drive mechanism is used to move the rear roof panel 7 from its raised position to its stowed position. In the example shown the motor vehicle has two rows of seats, therebeing a front row of seats having two seats 9 arranged side by side and a rear row of seats having two seat assemblies 10 arranged side by side. As can be seen with reference to FIG. 2, the rear roof panel 7 when in its stowed position is located between the front row of seats 9 and the rear row of seat assemblies 10 and lies just behind the front row of seats 9. The front roof panel 6 is located substantially horizontally to the rear of the front row of seats 9 so that it covers the rear row of seat assemblies 10. Therefore, when the two roof panels 6, 7 are in their raised positions they define a four seat hatchback vehicle and when the two roof panels 6, 7 are in their stowed positions they define a two seat open top vehicle.

Each of the seat assemblies 10, of which only one is shown in FIGS. 1 and 2 comprises of a seat cushion 12 and a backrest 11 which are pivotally connected 23 together so that the backrest 11 can fold forward and lie upon the seat cushion 12 as shown in FIG. 2.

The backrest 11 has an upper edge above which is positioned an automatically stowable head restraint 13 supported by two rods 17 each of which is attached to a transverse support rail 21 for movement between a raised or stowed position in which a cushion part of the head restraint 13 is positioned adjacent to an inner surface of the rear roof panel 7 or rest against an inner surface of the rear roof panel 7 and a lowered or in use position in which the head restraint 13 is positioned above the upper edge of the backrest 11.

The support rail 21 is rotatably supported at each end by a respective bracket assembly 19 which is fastened to the rear roof panel 7. A latch mechanism 20 is attached to one of brackets 19 to hold the head restraints 13 in their respective lowered positions against the action of a spring 15. The latch mechanism 20 comprises of a pivotable arm having a finger which engages with an aperture in the support rail 21 when the support rail 21 is positioned such that the head restraints 13 are in their respective lowered positions.

It will be appreciated that the spring 15 is a torsion spring or helical extension spring, or the like to provide the biasing action required to return the head restraints 13 to their respective stowed positions when the latch mechanism 20 is released.

Both of the seat assemblies 10 forming the rear row of seats have an automatically stowable head restraint 13 positioned above them. However, it will be appreciated that the invention could be used with a rear row of seats having two seats with stowable head restraints positioned above them and a centre seat with no head restraint positioned above it or in a motor vehicle having three seats arranged in a row each of which has a respective stowable head restraint positioned above it.

The latch mechanism 20 is automatically released by the process of stowing one of the front and rear roof panels 6 and 7 and in this case is automatically released by the process of stowing the front roof panel 6.

The latch mechanism 20 is connected by a cable 14 to one of the arms forming part of the arm arrangement 8 on the right side of the motor vehicle used to move the front roof 6 between its raised and stowed positions. It will be appreciated that there is an arm arrangement 8 on both sides of the motor vehicle 5 but only the arm arrangement 8 on the right hand side of the motor vehicle 5 is used in this case to release the latch mechanism 20. It will be appreciated that the cable 14 could be replaced by a rod linkage, a chain linkage or a fluid connection.

When the front roof 6 is moved from its raised position the arm of the front roof mechanism 8 to which the cable 14 is attached rotates and pulls on the cable 14 which then pulls on the arm of the latch mechanism 20 holding the head restraints 13 in their respective lowered positions. This causes the arm of the latch mechanism 20 to disengage from the aperture in the support rail 21 and the support rail 21 then rotates under the action of the spring 15 causing the two head restraints 13 to be moved to their respective stowed positions.

Therefore, as soon as the front roof 6 starts to move from its raised position both of the head restraints 13 are automatically released to their stowed positions.

The head restraints 13 are moveable to their respective lowered positions by the action of a user of the motor vehicle 5 pulling against one of the two head restraints 13 until the latch mechanism 20 is reset.

It will be appreciated that other forms of latch mechanism 20 could be used to replace that shown in FIG. 3.

It will be further appreciated that instead of using a single cable connection 14 from the front roof mechanism to the head restraints 13, the head restraints 13 could be separately mounted on the rear roof panel 7 and separate latch mechanisms 20 could be used.

Also, it will be appreciated that cable connection 14 to the linkage or mechanism 8 used to raise and stow the rear roof 7 could be used to release the latch mechanism 20 or the cable 14 could be connected to a manual locking means 22 used to secure the front and rear roof panels 6 and 7 together where they meet when they are both in their respective raised positions as shown in FIG. 1.

It will be further appreciated that instead of using a cable connection 14, an electro-mechanical latch mechanism connected to an electronic controller 18 used to control the linkage or mechanism 8 for raising and stowing of at least one of the front and rear roof panels 6, 7 could be used to release the head restraints 13.

In such an arrangement, the electronic controller 18 could be operable to release the latch mechanism 20 so as to permit the head restraints 13 to move to their stowed positions either when a command is received from a user of the motor vehicle to stow at least one of the front and rear roof panels 6, 7 or when a signal is received from a sensor associated with one of the front and rear roof panels 6 and 7 or the linkage or mechanism 8 used to stow the front or rear roof panels 6 and 7 indicating that the roof panels 6, 7 are in the process of being stowed.

Therefore, in summary, the invention provides a motor vehicle with head restraint assemblies that are automatically stowed so that contact that would otherwise occur between the head restraints and one or other of the moveable roof panels is avoided.

It will be appreciated that when the seat assemblies 10 in the rear row of seats are in their folded forward positions as shown in FIG. 2 then the stowing of the head restraints 13 prevents contact with the folded backrest 11 and seat cushion 12 when the rear roof panel 7 is in its stowed position and so is required to permit the rear roof panel 7 to be properly stowed when the seat assemblies are folded down.

Therefore, in summary, the invention provides a head restraint that is automatically placed in a stowed position as part of the process of stowing one of the front and rear roofs.

It will be appreciated by those skilled in the art that although the invention has been described by way of example with reference to one or more embodiments it is not limited to the disclosed embodiments and that modifications to the disclosed embodiments or alternative embodiments could be constructed without departing from the scope of the invention.

What is claimed is:

1. A motor vehicle comprising:
    a front and a rear stowable roof panel, each panel moveable between raised and lowered positions;
    at least one seat assembly having a backrest;
    an automatically stowable head restraint rotatably supported by the rear roof panel for movement between a stowed position in which the head restraint lies adjacent an inside surface of the rear roof panel and an in use position in which the head restraint is positioned above the backrest of the seat assembly;
    a biasing means to bias the head restraint into the stowed position; and
    a latch mechanism to selectively hold the head restraint in the lowered position;
    wherein the latch mechanism is released by the process of lowering one of the front and rear roof panels so as to permit the head restraint to move to its stowed position.

2. A motor vehicle as claimed in claim 1 wherein the motor vehicle further comprises front and rear rows of seats wherein the rear roof panel when in the lowered position is stowed between the front and rear rows of seats.

3. A motor vehicle as claimed in claim 1 wherein the motor vehicle further comprises front and rear rows of seats and each of the seats in the rear row of seats further comprises a head restraint further defined as an automatically stowable head restraint.

4. A motor vehicle as claimed in claim 1 further comprising a linkage connected to part of the mechanism used to raise and lower the front roof panel wherein the latch mechanism is released by the linkage.

5. A motor vehicle as claimed in claim 1 further comprising a linkage connected to part of the mechanism used to raise and lower the rear roof panel wherein the latch mechanism is released by the linkage.

6. A motor vehicle as claimed in claim 1 further comprising a linkage connected to part of a locking mechanism used to hold the front and rear roof panels together when they are both in their respective raised positions wherein the latch mechanism is released by the linkage.

7. A motor vehicle as claimed in claim 4 wherein the linkage is selected from the group consisting of a cable linkage, a rod linkage, a chain linkage and a fluid connection.

8. A motor vehicle as claimed in claimed 1 further comprising an electronic controller wherein the latch mechanism is further defined as an electro-mechanical latch mechanism and is connected to the electronic controller;

wherein the electronic controller is used to control the raising and lowering of at least one of the front and rear roof panels; and wherein the electronic controller is operable to release the latch mechanism so as to permit the head restraint to move to its stowed position when a signal is received indicative that at least one of the front and rear roof panels is in the process of being moved to its lowered position.

* * * * *